US008499254B2

(12) United States Patent
Sareen et al.

(10) Patent No.: US 8,499,254 B2
(45) Date of Patent: Jul. 30, 2013

(54) SURFACING AND MANAGEMENT OF WINDOW-SPECIFIC CONTROLS (75) Inventors: Chaitanya Dev Sareen, Seattle, WA (US); Bret Anderson, Kirkland, WA (US); Stephan Hoefnagels, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 12/258,624

(22) Filed: Oct. 27, 2008

(65) Prior Publication Data
US 2010/0107123 A1 Apr. 29, 2010

(51) Int. Cl.
*G06F 3/048* (2006.01)

(52) U.S. Cl.
USPC ............... 715/779; 715/810; 715/838

(58) Field of Classification Search
USPC ........... 715/783, 838, 779, 797, 810
See application file for complete search history.

(56) References Cited

U.S. PATENT DOCUMENTS

| | | | |
|---|---|---|---|
| 5,920,316 A | 7/1999 | Oran et al. | |
| 5,922,054 A | 7/1999 | Bibayan | |
| 6,335,745 B1* | 1/2002 | Amro et al. | 715/835 |
| 6,489,975 B1* | 12/2002 | Patil et al. | 715/781 |
| 6,624,831 B1* | 9/2003 | Shahine et al. | 715/815 |
| 6,857,105 B1 | 2/2005 | Fox et al. | |
| 6,907,365 B2 | 6/2005 | Salant et al. | |
| 2004/0068423 A1 | 4/2004 | Shaw | |
| 2005/0044058 A1* | 2/2005 | Matthews et al. | 707/1 |
| 2005/0251758 A1 | 11/2005 | Cummins et al. | |
| 2006/0123353 A1* | 6/2006 | Matthews et al. | 715/779 |
| 2006/0224997 A1 | 10/2006 | Wong et al. | |
| 2006/0235817 A1 | 10/2006 | Wong et al. | |
| 2006/0242602 A1* | 10/2006 | Schechter et al. | 715/838 |
| 2006/0265417 A1 | 11/2006 | Amato et al. | |
| 2007/0016872 A1 | 1/2007 | Cummins et al. | |
| 2007/0245246 A1* | 10/2007 | Oren et al. | 715/744 |
| 2008/0034325 A1* | 2/2008 | Ording | 715/838 |
| 2008/0184158 A1* | 7/2008 | Selig | 715/781 |
| 2008/0195951 A1 | 8/2008 | Oshiro et al. | |
| 2009/0279676 A1* | 11/2009 | Zazza | 379/88.17 |

FOREIGN PATENT DOCUMENTS
KR 1020040032071 A 4/2004

OTHER PUBLICATIONS

"Bottom Toolbars", retrieved at <<https://imgae.tamu.edu:8443/ecm_help/nav/wp_start.htm?../ae_help/workplace/javaview/jv_multi-page_display.htm>>, Aug. 25, 2008, pp. 3.
"What's JetPhoto", retrieved at <<http://www.jetphotosoft.com/web/manual/overview.html>>, Aug. 26, 2008, pp. 6.
"Program Features", retrieved at <<http://netez.com/2xExplorer/intro.html>>, Aug. 26, 2008, pp. 2.
"Configuring Outlook 2002/2003 for Windows for UW Email", retrieved at >>http://www.washington.edu/computing/support/windows/office/outlookconfig.html#PURGE1>>, Aug. 26, 2008, pp. 14.
"International Search Report", Mailed May 20, 2010, Application No. PCT/US2009/062234, Filed Date Oct. 27, 2009, pp. 1-12.

* cited by examiner

*Primary Examiner* — Kieu Vu
*Assistant Examiner* — Blaine Basom (57) ABSTRACT

The functionality traditionally provided by an application program through a window presented as part of a window-based user interface can be accessed while the window remains hidden. A toolbar, or similar collection of user interface elements, can be presented when a user indicates an intention to interact with an application program whose window is hidden. The toolbar can comprise elements associated with functions specific to the hidden window. The user's selection can be communicated to the application program so that it can perform the requested function. If the user no longer indicates an intention to interact with the application program, the toolbar can be removed. In one embodiment, the toolbar can be presented together with a thumbnail of the relevant window in a floating display element.

18 Claims, 6 Drawing Sheets

SURFACING AND MANAGEMENT OF WINDOW-SPECIFIC CONTROLS

BACKGROUND

The most popular user-interface paradigm in modern personal computing devices is the "desktop" paradigm, where information associated with work the user is performing on the computing device is centrally displayed, such as within one or more windows, and additional information relevant either to that work, or to the overall status of the computing device and the computer-executable instructions executing on the computing device is peripherally displayed. Such a "desktop" paradigm is meant to mirror a typical physical work desk, where documents associated with the work currently being performed are typically placed within the center of the desk, and the periphery of the desk comprises other tools or documents that may be referenced, though less frequently.

Information typically presented to a user within the periphery of a computing device's display can include notifications, such as the current time, the status of various aspects of the computing device, such as whether it is connected to a network or the current charge capacity of the computing device's battery, and notifications relevant to processes executing on the computing device, such as a notification that new hardware was detected, a malware scan is being performed, or other like notifications. Information typically presented to a user within the periphery of a computing device's display can also include indications of tasks, either that the user has already initiated, or that the user often uses. For example, such tasks can include visual representations of one or more processes or application programs that the user has already executed, or visual representations of one or more processes or application programs that the user often executes.

Many users of modern computing devices have multiple application programs and other processes executing simultaneously. Within each of these application programs or processes, furthermore, users may have caused the presentation of multiple individual windows or similar visual divisions. Consequently, the presentation of such tasks within the periphery of a display can either overwhelm the display, such that little room is left for the information associated with the work the user currently seeks to focus on, or the presentation of such tasks can be too abstract, requiring the user to perform multiple, often counter-intuitive, actions in order to access or interact with such tasks.

SUMMARY

Representations of tasks, such as icons of application programs that are already executing, can comprise one or more smaller visual presentations of each window or other display sub-element currently maintained by the application program or other task. Such smaller visual presentations, or "thumbnails" can be displayed when a user indicates a desire to interact with the application program, such as by moving the cursor over the icon or other representation of the application program. To maintain an uncluttered "desktop" motif, however, such thumbnails can remain hidden while the user is performing other tasks, or is otherwise not indicating a desire to interact with the associated application program.

In one embodiment, to enable a user to interact with specific windows, or other display sub-elements of an application program, without requiring the user to perform all of the tasks needed to activate, and bring to the forefront of the display, that window or display sub-element, a toolbar can be presented when a user indicates a desire to interact with the associated application program. The toolbar can be presented with the corresponding thumbnails of the window or display sub-element, when those are presented, thereby providing the user with context for the presented controls of the toolbar. The controls of the toolbar can provide access to window-specific functionality that can enable a user to perform tasks that would traditionally require the user to bring to the forefront of the display the corresponding window or display sub-element. When the user is no longer indicating a desire to interact with the associated application program, the toolbar can be hidden.

In another embodiment, a toolbar comprising window-specific actions can be presented in an "extended desktop" paradigm. More specifically, rather than tying the display of the toolbar to, for example, the display of the thumbnails of the windows associated with the functions presented in the toolbar, the toolbar can, instead, be displayed on its own. The toolbar can be displayed when a user indicates a desire to interact with the associated application program and can, likewise, be hidden when the user no longer indicates a desire to interact with such a program.

In a further embodiment, rather than displaying window-specific controls, a toolbar, that is presented when a user indicates a desire to interact with an associated application program, and is hidden when the user no longer indicates such a desire, can instead display notifications that can be specific to the associated application program or window or other display sub-element of the application program. Such notifications can include status indications, such as the percentage of a task that is being completed, or the connectivity of a peripheral device that the application is managing, or they can include alert notifications, such as an indication that an error has occurred or a task has been completed.

In a still further embodiment, application programs can provide, such as to an operating system or other utility providing the above-indicated functionality, a specification of buttons or other interface elements and their associated functions for any one or more windows, or other display sub-elements, that are being utilized and maintained by the application programs. The information provided by such application programs can be updated by them and, if the controls are being displayed to the user, such updates can be reflected in the display. When a user selects one of the displayed interface elements, such a selection can be communicated to the associated application program to enable it to provide the selected functionality to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the presentation, to a user of a computing device, of one or more controls that are specific to a window or other display sub-element, thereby enabling the user to perform functions without switching the user's current focus. The presentation of such controls can occur in a manner that minimizes any obtrusiveness, such as by displaying the controls only when the user performs an action that indicates an intent to interact with an application program or other executing process that is associated with such controls. The controls can be presented proximally to images representing minimized versions of the window or other display sub-element with which the controls are associated. Alternatively, the controls can be displayed on their own. An operating system, or other utility, can provide for the display of such controls. Application programs can communicate with such an operating system or utility, providing to it information regarding the controls to be presented, and receiving from it indications of when specific controls are selected.

The techniques described herein focus on the presentation of window-specific controls within the context of a window-based computing device interface, such as an interface conforming to the "desktop" paradigm. The techniques described herein also focus on the presentation of such window-specific controls by an operating system responsible for the overall user interface presentation. However, the techniques described herein are not so limited. For example, the techniques described can be equally applied to any type of interface, and do not require any inherent aspect of the "desktop" paradigm. Similarly, the techniques described can be implemented by any computer-executable instructions capable of performing the mechanisms described, and do not rely upon any functionality offered only by operating systems. Consequently, while the descriptions below will be provided with particular reference to specific interfaces and functionality as provided by an operating system, the descriptions are not intended to be so limited and are, instead, meant to be illustrative of any of the mechanisms by which the below-described techniques can be implemented.

Although not required, the description below will be in the general context of instructions being executed by a device having computational abilities. Such "computing devices" include both traditional computers and consumer-electronic devices having computational abilities, such as those provided by a central processing unit. Thus, the description below will be in the general context of "computer-executable instructions," such as program modules, that are capable of being executed by such a "computing device." More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers and conventional personal electronics devices, and can include other devices capable of computation, including hand-held devices, multi-processor systems, other microprocessor based or programmable consumer electronics, network PCs, minicomputers, mainframe computers, and the like. Similarly, the computing devices need not be limited to a stand-alone device, as the mechanisms may also be practiced in distributed computing environments where tasks are performed by remote processing devices that are linked through a communications network. In a distributed computing environment, program modules may be located in both local and remote memory storage devices.

Figure 1:
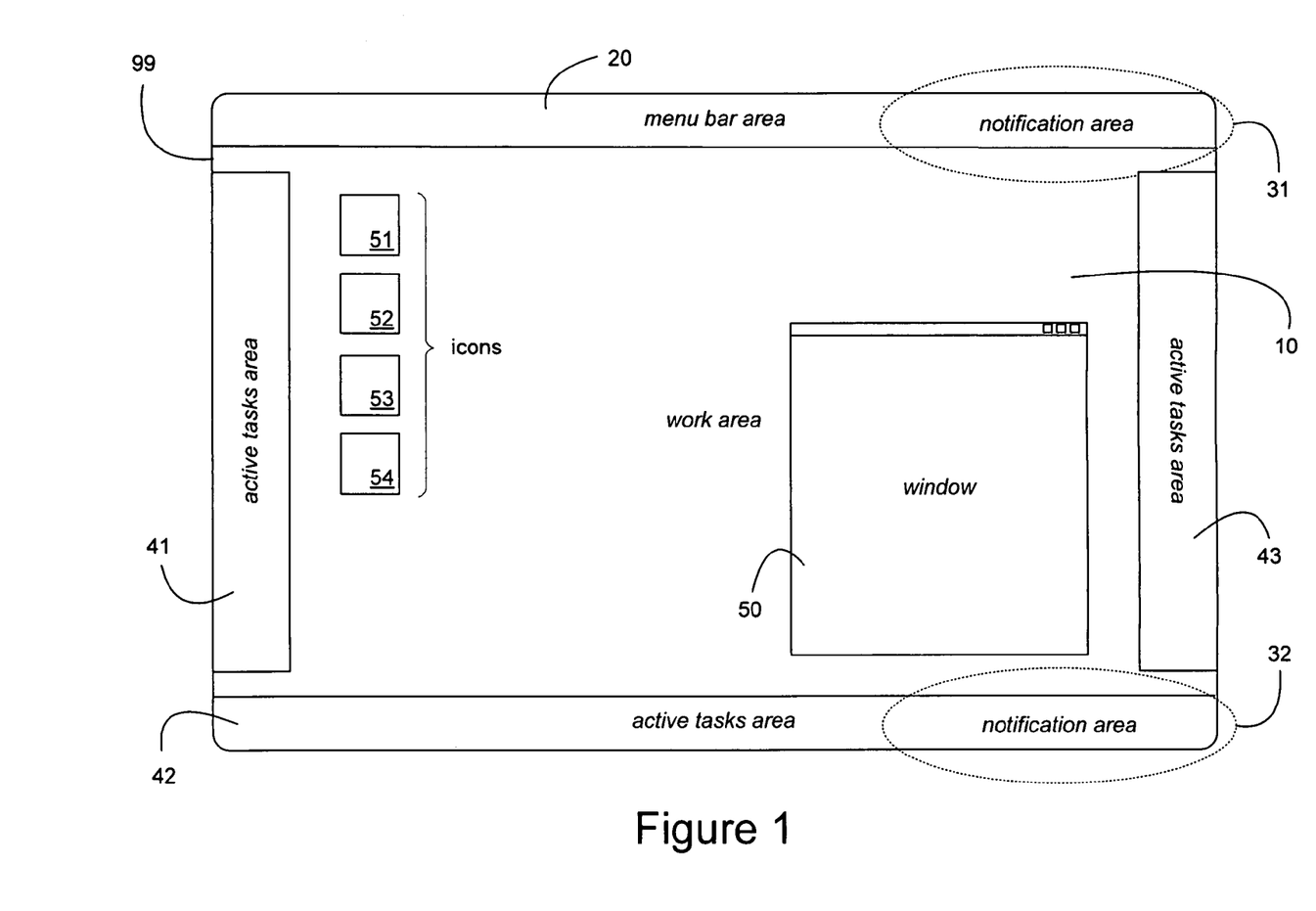
FIG. 1 is a diagram of an exemplary desktop-paradigm display interface that provides context for the described functionality.

With reference to FIG. 1, an exemplary display 99 is illustrated, providing context for the descriptions below. The exemplary display 99 illustrates a typical "desktop" computing device interface paradigm, with a central work area 10 that can comprise display sub-elements, such as window 50, icons, such as icons 51, 52, 53 and 54 and other representations that can be directed to the one or more activities that a user may currently be performing on the computing device. As will be known by those skilled in the art, and as utilized herein, the term "window" is meant to refer to any display sub-element that can be independently controlled and can provide a bounded region within which information can be displayed to the user.

In addition to the work area 10 and elements contained within it, the exemplary display 99 can further comprise a menu bar area 20 at the top of the display for providing access to menus or similar user interface elements. Often, as shown in FIG. 1, the menu bar area 20 can further include a notification area 31 for providing notifications or status indicators, such as a current time, a network connectivity indicator, a battery indicator and the like. The exemplary display 99 can also comprise one or more areas around the periphery of the display that can be utilized to provide the user with simplified access to computer-executable instructions, such as application programs, that can be already executing, or which are commonly used by the user, with additional indications for those that are already executing. The exemplary display 99 illustrates three such areas, namely the active tasks areas 41, 42 and 43. Traditionally, only one active task area is utilized, and, in some instances, the user is allowed to select which of the active tasks areas 41, 42 and 43 will be utilized. However, the descriptions below are equally applicable if more than one active tasks area is simultaneously utilized.

Traditionally, an active tasks area, such as active tasks areas 41, 42 and 43 can comprise icons or other indicators of the application programs that are currently executing or are otherwise often utilized by the user. Such indicators can vary in size, but are often fairly small to enable multiple such indicators to exist within the active tasks area without impinging on the work area 10. In addition, the active tasks areas, such as active task area 42, can also comprise notification areas, such as notification area 32, that can comprise alerts or notifications similar to those described above with reference to the notification area 31.

Figure 2:
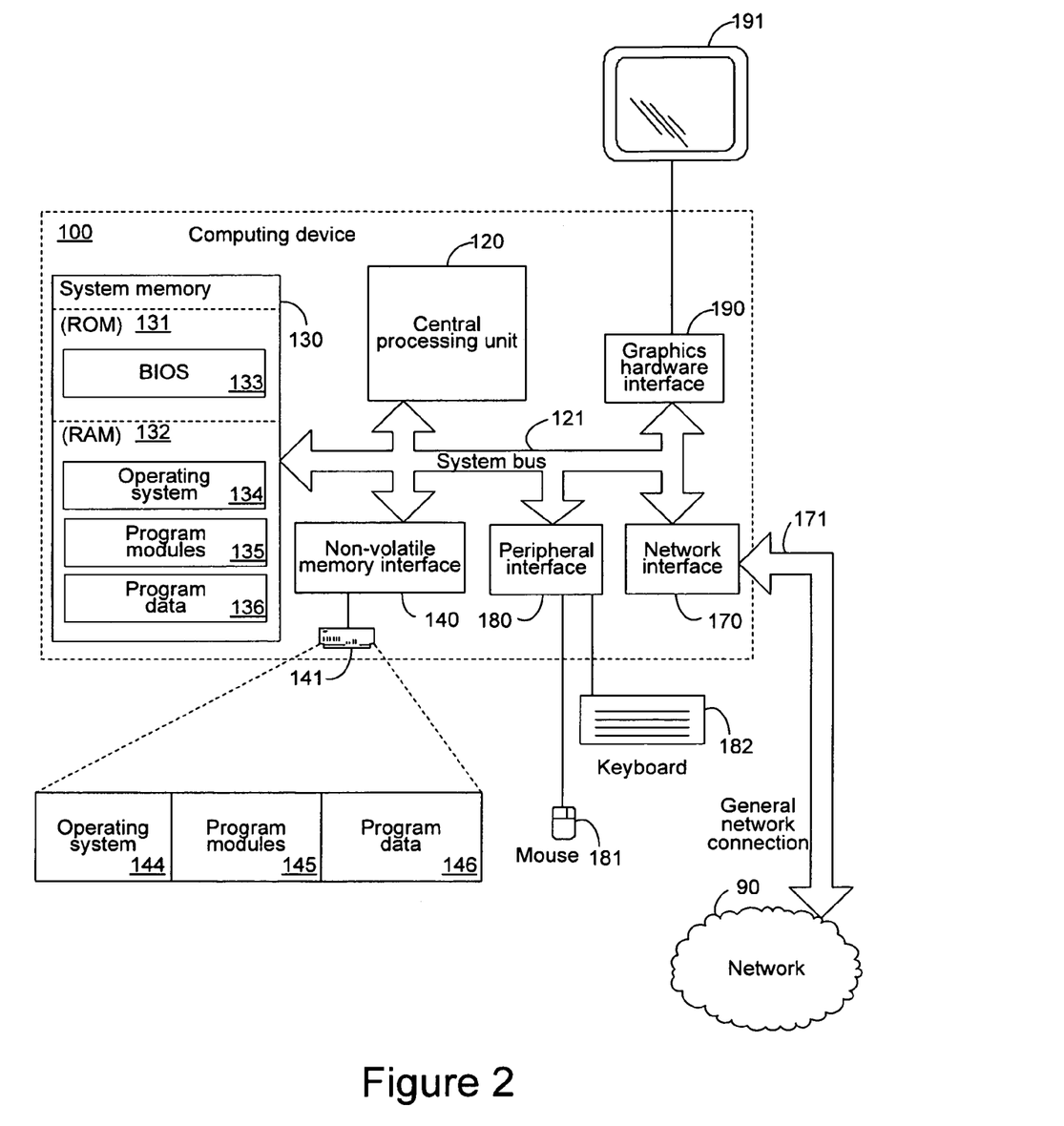
FIG. 2 is a block diagram of an exemplary computing device.

Before proceeding with further descriptions within the context of a computing device display, such as the exemplary display 99, a brief description of an exemplary computing device for generating such a display is provided. Turning to FIG. 2, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can include graphics hardware, including, but not limited to, a graphics hardware interface 190 and a display device 191 that can be utilized to present, to the user, displays, such as, for example, the exemplary display 99 described above. Additionally, the computing device 100 can also include user interface elements, including, but not limited to a mouse 181 and a keyboard 182 that can be utilized by a user to generate input in response to the interface displayed via the display device 191. The user interface elements can be communicationally coupled to the system bus 121 via a peripheral interface 180.

The computing device 100 also typically includes computer readable media, which can include any available media that can be accessed by computing device 100 and includes both volatile and nonvolatile media and removable and non-removable media. By way of example, and not limitation, computer readable media may comprise computer storage media, communication media or combinations thereof. Computer storage media includes media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through an interface such as non-volatile memory interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. For simplicity of illustration, and in conformance with the exemplary system 99 of FIG. 1, the computing device 100 is shown in FIG. 2 to be connected to the network 90. The computing device 100 is not limited to any particular network or networking protocols. The network connection depicted in FIGS. 1 and 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Turning back to FIG. 1, as indicated previously, the work area 10 of the exemplary display 99 can comprise one or more windows, such as the window 50. If the user is performing multiple tasks, or has multiple such windows, often being presented by multiple application programs, the work area 10 can become overly cluttered, and the user cannot properly see all of the information being provided by any one window, such as the window 50. Traditionally, in such a case, windows that are not currently of interest to the user, but which the user nevertheless wishes to remain open, accessible and available, can be minimized or otherwise hidden and a reference can be made to those windows within the active tasks area, such as active tasks areas 41, 42, or 43. When the user seeks to interact with those hidden windows again, the user can direct an action, such as a selection action, towards the reference within the active tasks area, and the hidden window can again be presented to the user. The user can then interact with the window in a traditional manner.

Often, one or more of the tasks that a user is performing are tasks that require only intermittent interactivity. For example, the user can be listening to a collection of digitized music. Such a task may only intermittently require the user to interact with it, such as when the user wishes to skip a song, or when the user wishes to pause the playback of the digitized music for a temporary period of time. As another example, the user may have one or more web pages or other networked information presentations open in one or more windows, and may only occasionally interact with them, such as occasionally refreshing them to see if any new information has been posted to them. Because the user is not continuously interacting with such tasks, the one or more windows within which information related to those tasks is presented can be minimized or hidden by the user to provide greater room within the work area 10 for the tasks with which the user is continuously interacting. Consequently, occasional or intermittent interactivity can become burdensome to the user because the user is now forced to first maximize, or otherwise bring to the forefront of the work area 10, one or more windows associated with the task, then perform the action that the user desired, and then again minimize or otherwise hide the window again.

To enable users to interact with windows that are minimized or hidden, without requiring the user to bring such windows to the forefront, and thereby disrupt their current focus, access to one or more commonly utilized functions specific to such windows can be presented to the user in a non-invasive manner. Specifically, a toolbar of one or more buttons or other interface elements can be presented to the user when the user indicates an intention to interact with an application program associated with one or more hidden windows. Such a toolbar can otherwise remain hidden, thereby leaving the work area 10 uncluttered and unobscured.

Figure 3:
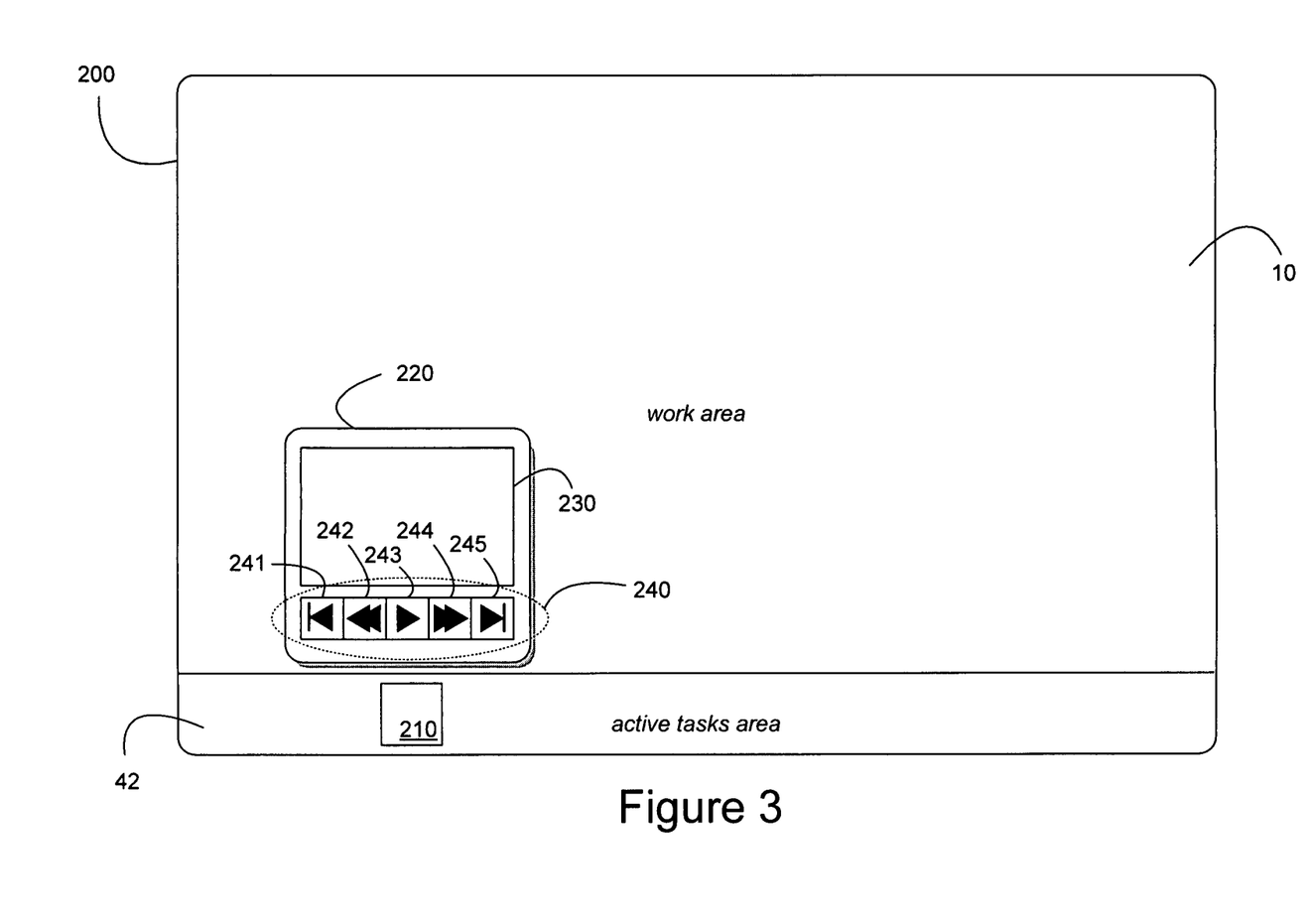
FIG. 3 is a diagram of an exemplary display showing a window-specific toolbar.

Turning to FIG. 3, an exemplary display 200 is shown illustrating one embodiment of presenting a toolbar comprising interface elements representing accessible window-specific functions. In particular, as shown in the exemplary display 200, a window, such as window 50 of FIG. 1, can have been minimized or otherwise hidden. Consequently, an indication, such as an icon 210 of an application program associated with the hidden window, can exist in the active tasks area, such as active tasks area 42. The icon 210 can provide a user with a mechanism by which the user can access the application program responsible for the hidden window and, consequently, access the hidden window and return it to the forefront of the work area 10. Traditionally, the user can be provided with access to the application program represented by the icon 210 when the user "clicked on" or otherwise directed a selection action to the icon 210.

However, as shown in the exemplary display 200, if the user merely "hovers" their cursor over the icon 210, such as would be controlled by the mouse 181, or otherwise indicates an intent to interact with the application program associated with the icon 210, but does not actively cause that application program, and any associated windows, to be brought to the forefront, the user can, instead, be presented with a floating display element 220 that can, in the illustrated embodiment, comprise a miniaturized version of the hidden window, thereby providing the user with a visual cue as to the contents and scope of the hidden window. The miniaturized version of the window will be referred to herein as a "thumbnail" of the window. Thus, as shown in the exemplary display 200, the floating display element 220 can comprise a thumbnail 230 that can show the user what they would be bringing to the forefront, should the user decide to select the icon 210.

In addition to the thumbnail 230, the floating display element 220 can further comprise a toolbar 240 that can, in turn, comprise interface elements that can provide the user with access to functionality associated with the window represented by the thumbnail 230. In the illustrated exemplary display 200, the exemplary toolbar 240 comprises buttons 241, 242, 243, 244 and 245 that can provide the user with access to, for example, commonly utilized functions of a digital music player software application. The illustrated play button 243 can, for example, enable a user to resume playback of digitized music by the application program associated with the icon 210 and the thumbnail 230, without requiring the user to bring the window associated with the thumbnail 230 to the forefront. Similarly, if the user is listening to the playback of digital music by the application program associated with the icon 210, and a song the user does not wish to hear starts to play, the user can cause the display of the floating display element 220, in the manner described above, and can select the next song button 245 or the fast-forward button 244, thereby causing the digital music application program to perform the associated function without requiring the user to bring the window associated with the thumbnail 230 to the forefront, or otherwise interrupting the user's current focus. Specifically, once the user selected the next song button 245 or the fast-forward button 244, the user could return to their prior action and the floating display element 220 would simply disappear, since the user would no longer be indicating an intention to interact with the application program associated with the icon 210. The prior song button 241 and the rewind button 242 could be used in a like fashion to replay a song, or a part of a song, without interrupting the user's current focus.

As indicated, when the user no longer indicates an intention to interact with the application program associated with the icon 210, the floating display element 220 can disappear or otherwise be hidden or removed from the display 200, leaving the icon 210 in the active tasks area 42. For example, if the user uses the mouse 181 to remove the cursor from hovering over the icon 210, such as when the user proceeds to use the cursor to perform other actions, the removal of the cursor from the area of the icon 210 can be an indication that the user no longer intends to interact with the application program associated with the icon 210 and, consequently, the floating display element 220 can be removed from the display 200.

In one embodiment, because of the limited display area provided by, for example, the floating display element 220, the toolbar 240 can comprise a predetermined or dynamically established maximum number of buttons, such as buttons 241, 242, 243, 244 and 245. In such a case, the addition of further buttons by an application program, such as the application program associated with the icon 210, can result in some of the currently displayed buttons being removed. In one embodiment, such a removal can proceed in a left-to-right manner, such that the most recently added button can be added to the left side of the toolbar 240, while the right-most button can be the first button to be removed.

In another embodiment, rather than removing buttons based on their location within, for example, the toolbar 240, buttons can be removed based on the respective importance of the functions associated with the buttons. More specifically, when providing information relevant to the buttons of the toolbar 240, the application program associated with the icon 210 can further specify a relative importance of the one or more buttons specified. Subsequently, should such an application program request that additional buttons be added to the toolbar 240, the operating system, or other utility displaying the toolbar, can determine whether such additional buttons can be added based on the relative importance of the buttons currently present within the toolbar, as compared to that of the buttons being added. If the buttons being added have a higher relative importance, as specified by the originating application program, the buttons with the lowest relative importance can be the first ones removed from the toolbar 240 to provide space for the newly added ones.

While the toolbar 240 is illustrated in the display 200 of FIG. 3 as being visually connected to a thumbnail 230, in other embodiments, a toolbar providing equivalent functionality to toolbar 240, and behaving in an equivalent manner, can be displayed outside of the context of thumbnails. Thus, for example, turning to FIG. 4, a display 300 is shown illustrating a toolbar 330 that can comprise similar functionality and behavior to the toolbar 240, described in detail above, except that toolbar 330 can be displayed independently of any thumbnails or other indicators of the window with which the toolbar 330 is associated. In the display 300, the active tasks area 41 is being utilized, and it can comprise an icon 310 of an application program that can be executing on the computing device providing the display 300. The floating display element 320 can be displayed in a manner similar to that described above with reference to floating display element 220; specifically, when the user indicates an intention to interact with the application program associated with the icon 310, the floating display element 320 can be displayed, and it can be hidden, or no longer displayed, when the user no longer indicates such an intention.

Figure 4:
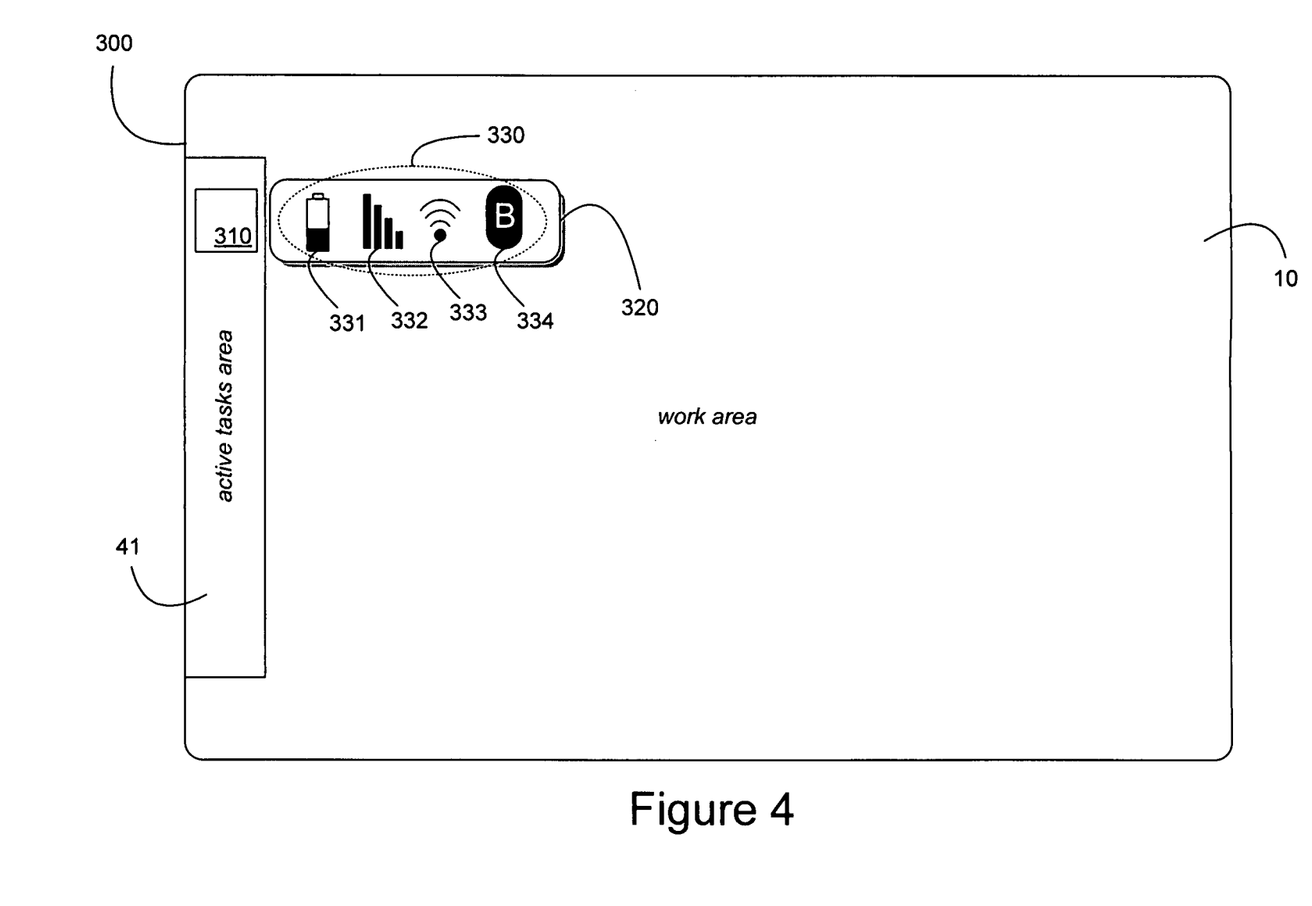
FIG. 4 is a diagram of another exemplary display showing a window-specific toolbar.

As also indicated in FIG. 4, the toolbar 330 can comprise, not only buttons, or similar user interface elements, that can directly access at least a portion of the functionality of the application program, but it can also comprise notifications, such as status notifications or alerts, that are relevant to the window with which the toolbar 330 is associated. Thus, for example, in the illustrative display 300, the toolbar 330 can comprise status notifications 331, 332, 333 and 334, which, as illustrated, can provide the status of the battery and the wireless connectivity, respectively, of, for example, a wireless device that is being managed by the application program associated with the icon 310. Alternatively, although not shown in FIG. 4, the toolbar 330 could instead comprise notifications, such as, for example, notifications of the arrival of new email messages, if the window with which the toolbar 330 was associated was a window of an email application program, or notifications of the completion of a task being performed by the application program in the window associated with the toolbar 330.

Figure 5:
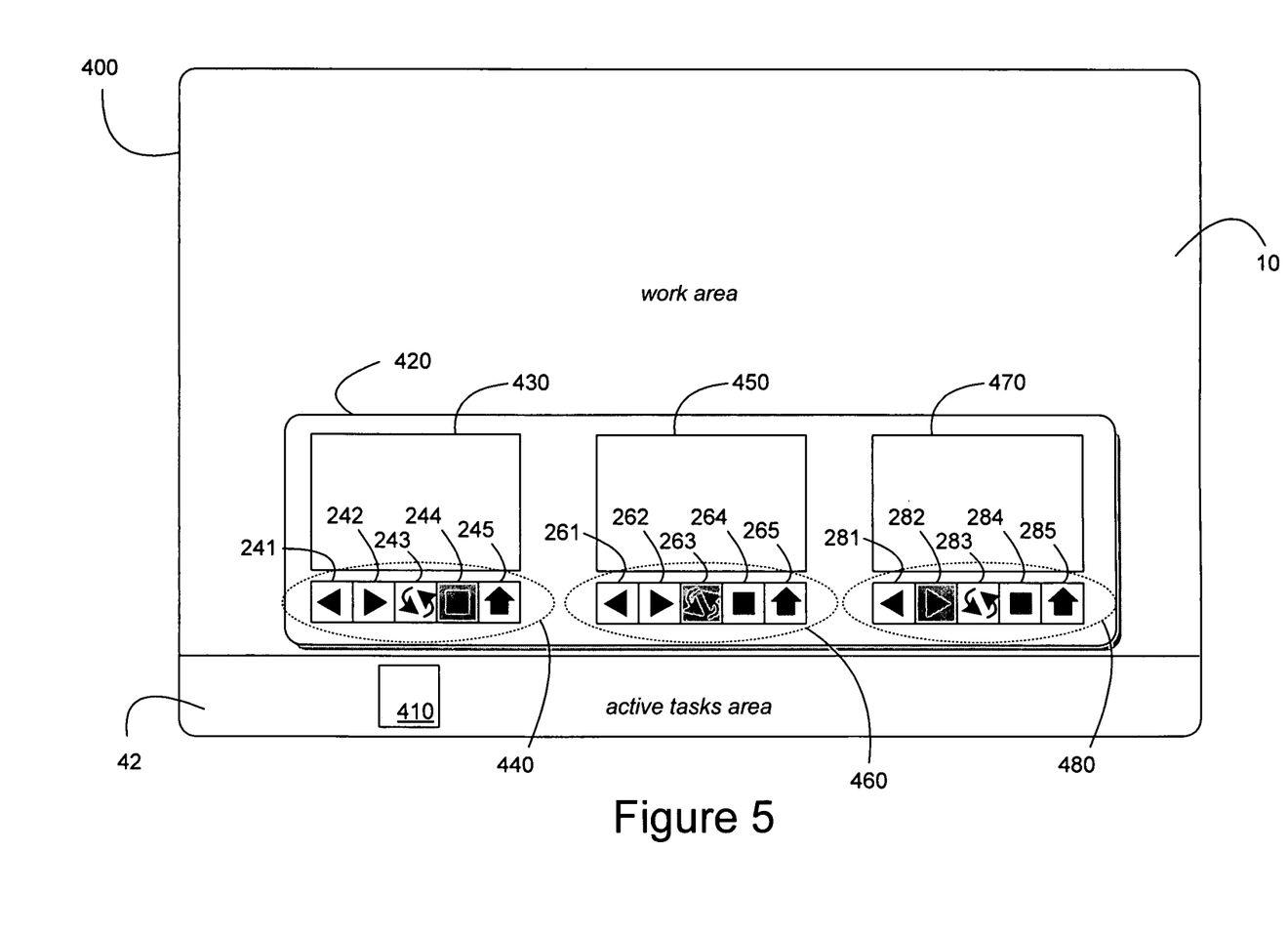
FIG. 5 is a diagram of an exemplary display showing multiple window-specific toolbars.

In other embodiments, the application program associated with the icon in the active tasks area can have multiple windows open and active. If those windows were minimized then a toolbar, such as toolbars 240 or 330, could be presented for each such window. Turning to FIG. 5, a display 400 is shown, with an icon 410 in the active tasks area 42 corresponding to an application program that can have multiple windows active, though hidden. In such a case, should a user indicate an intention to interact with the application program associated with the icon 410, such as by hovering their cursor over the icon in the manner described above, a floating display element 420 can be shown comprising information associated with each of the windows of the application program. In the illustrated embodiment shown in FIG. 5, the application program associated with the icon 410 can have three windows active. Consequently, the floating display element 420 can comprise, for example, thumbnails 430, 450 and 470, associated with each of those windows and displaying a miniaturized version of those windows. Of relevance to the above descriptions, the floating display element 420 can also comprise toolbars 440, 460 and 480, also associated with each of the three windows of the application program associated with the icon 410. As shown, in one embodiment, the physical proximity between the toolbars 440, 460 and 480, and the thumbnails 430, 450 and 470, respectively, can illustrate the association between a toolbar and a currently hidden window. In other embodiments, such an association can be communicated via window titles, or other identifying elements, that can be proximally displayed to the appropriate toolbars, such as toolbars 440, 460 and 480.

As with toolbars 240 and 330, the toolbars 440, 460 and 480 can provide access to window-specific functionality, or can provide window-specific notifications, such as alerts or status notifications. In the particular example shown in the exemplary display 400 of FIG. 5, the application program associated with the icon 410 can be a web browser application program, or similar networked page information retrieval program. Consequently, the toolbars 440, 460 and 480 can provide access to functionality specific to such an application, such as, for example, a back button 241, 261 and 281, a forward button 242, 262, 282, a refresh button 243, 263 and 283, a stop loading button 244, 264 and 284, and a home page button 245, 265 and 285, respectively. Should one or more of the functions associated with such buttons not be relevant to a particular window, the toolbar associated with that window may display such a button, or other user interface element, as being "grayed out" or otherwise indicated as not utilizable. For example, the window associated with the thumbnail 430 can have a web page that has already been completely downloaded and displayed. Consequently, the stop loading button 244 associated with such a window can be inactive, since such a command may not be applicable to a web page that has already been loaded. Similarly, as an example, the window associated with the thumbnail 470 can be displaying the most recent webpage to which a user has browsed and, consequently, the forward button 282 can be inactive, since there is no additional page further forward than the currently displayed page.

Figure 6:
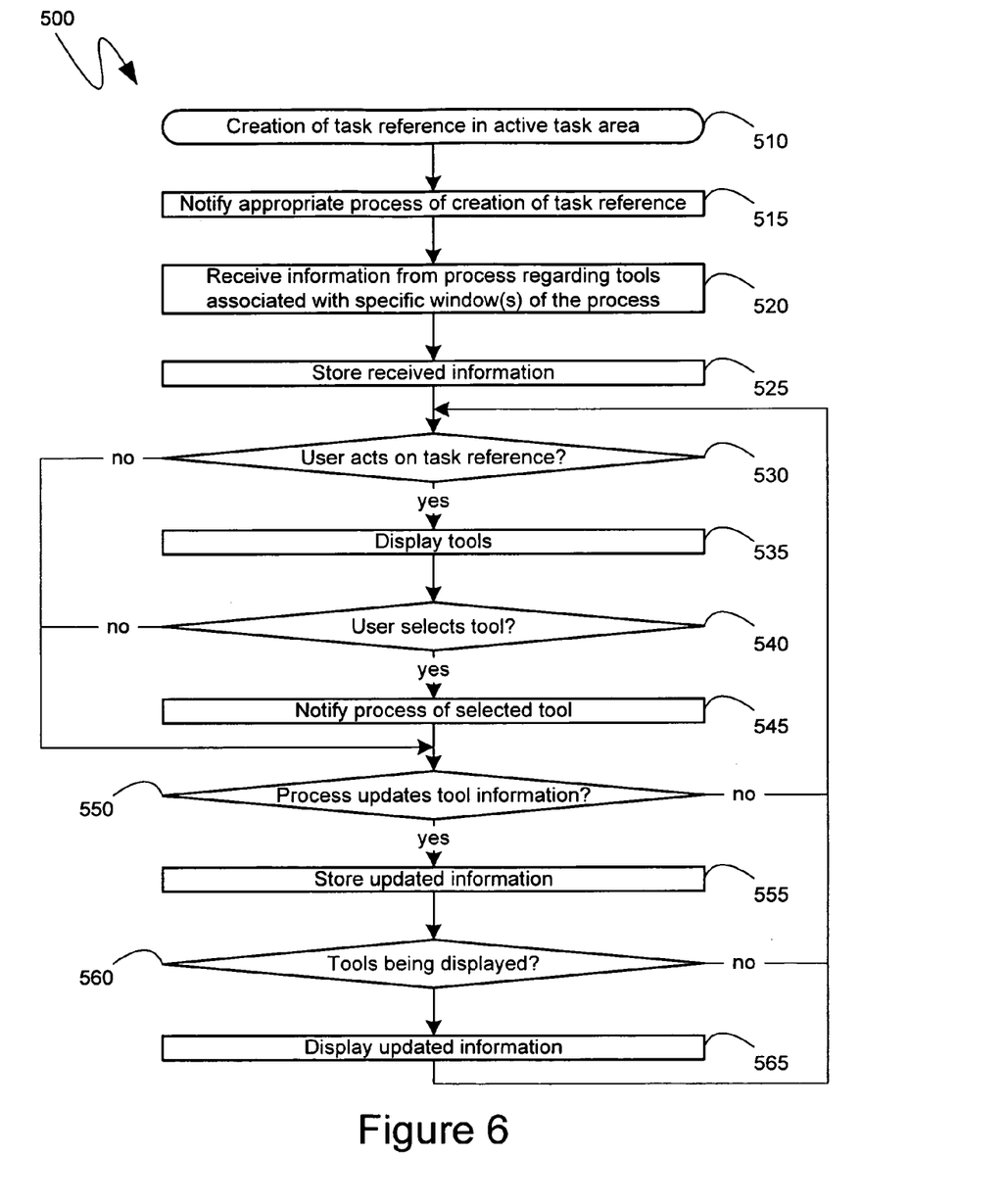
FIG. 6 is a flow diagram of an exemplary process for displaying and utilizing window-specific toolbars.

To provide for the functionality of the window-specific toolbars described above, communications can exist between the application program having the functionality and the operating system or utility hosting, and displaying, the toolbars. Turning to FIG. 6, a flow diagram 500 illustrating an exemplary series of communications between such entities is shown. Initially, at step 510 as shown, computer-readable instructions, such as an application program, can have a task reference, such as the icons 210, 310 or 410, created in the active tasks area, such as active tasks area 41, 42 or 43. Subsequently, at step 515, the application program or other process associated with that task reference can be notified of the creation of that task reference in the active tasks area. Such a notification can enable the process receiving it to know that it can now provide information regarding a window-specific toolbar that can be displayed when the user indicates an intention to interact with the task reference and, more generally, with the process itself.

After the application program, or other process, has been notified at step 515, and after it has created at least one window for displaying information to a user, and otherwise interacting with the user, the application program can provide information regarding the tools or functionality associated with one or more of its windows. Thus, at step 520, information from the application can be received regarding functionality associated with a particular window that can be exposed via tools, buttons, or similar user interface elements. This information can be stored at step 525 such that it can be easily accessed or modified.

The flow diagram 500 illustrates one exemplary mechanism, with references to steps 530 through 565, for monitoring if the user has acted upon the task reference, if the user has selected a tool or if the process providing the functionality exposed by the tools has updated one or more tools. However, the exemplary mechanism illustrated in flow diagram 500 has been quantized for easier illustration and explanation. As will be known by those skilled in the art, the checks performed by steps 530, 540 and 550, as described below, need not be performed in the linear manner illustrated in flow diagram 500 and can, instead, be performed in parallel and/or continuously. Consequently, the below descriptions of steps 530 through 565 are not meant to indicate a dependency relationship, but rather one mechanism for implementing the monitoring described.

Once the information received from the application program, or other process, is stored at step 535, in one embodiment, a check can be performed, at step 530, to determine whether the user has acted upon the task reference created at step 510, such as by hovering their cursor over it, or otherwise indicating an intention to interact with the process or application program associated with such a task reference. If the user has acted upon the task reference, as determined at step 530, a toolbar comprising the buttons, tools or other function-accessing user interface elements specified at step 520, can be displayed at step 535. If, however, the user has not yet acted upon the task reference, as determined at step 530, processing can proceed to step 550, where a check can be made to determine if updated information was received from the application program, or other process providing the functionality accessible by the tools. As indicated previously, and as will be known by those skilled in the art, the check, at step 550, to determine if updated information was received need not be an explicit check, and can, instead, represent, merely the ability of the described mechanisms to recognize the updating of tool information and the ability of those mechanisms to receive such updates and act upon them in a timely manner.

Returning back to the display of the toolbar at step 535, if, as subsequently determined at step 540, the user selects one of the tools displayed at step 535, the process associated with the displayed toolbar can be notified of that selection at step 545. Thus, for example, returning to the exemplary display 200 of FIG. 3, if the user were to select the play button 243, the selection of that function could be communicated to the digital music player application program associated with the icon 210 to cause that application program to commence playback of the next digital music file. However, if, at step 540, it is determined that a user has not selected a tool, then processing can proceed to step 550.

If, at step 550, no updates were received, then processing can return to step 530, and, consequently, step 530, thereby continuously monitoring whether the user has selected a tool, while also monitoring whether the user is continuing to act upon the task reference, such as by continuing to hover their cursor over it. If an update to the tools was received, as determined by step 550, processing can proceed to store the updated information at step 555. In one embodiment, the storage of the updated information at step 555 can overwrite the outdated aspects of the information stored at step 525. Subsequently to storing the updated information at step 555, a check can be made at step 560 as to whether the tools are currently being displayed to a user. If the tools are being displayed, the display can be modified at step 565 to include the updated information. Thus, for example, returning to the exemplary display 200 of FIG. 3, if the user selected the play button 243, then at step 550 updated tool information can be received that can, for example, change the play button 243 into a pause button, since the play button 243 would no longer access useful functionality if the digitized music file was already being played and different functionality, namely the pause functionality, would be more useful to a user. Subsequently, at step 560, a determination could be made that the toolbar 240 was still being displayed and, as a result, at step 565, the updated information could be displayed, effectively causing the play button 243 to appear to change into a pause button.

Returning to step 560, if, at step 560, a determination was made that the updated tools were not currently being displayed, then processing could return to step 530 and, as indicated above, thereby continuously monitor whether the user has selected a tool, while also monitoring whether the user is continuing to act upon the task reference. Similarly, if, at step 560, it is determined that the tools are being displayed, and, at step 565, the updated information is displayed, processing can still return to step 530, thereby again performing the continuous monitoring described.

As can be seen from the above descriptions, an interface for enabling a user to access functionality without bringing an associated window to the forefront has been presented. In view of the many possible variations of the subject matter described herein, we claim as our invention all such embodiments as may come within the scope of the following claims and equivalents thereto.

We claim:

1. One or more computer-readable storage media comprising computer-executable instructions for providing access to functionality associated with a window while the window remains hidden, the computer-executable instructions directed to steps comprising:
   generating a display of a task reference for an application program that is hosting the window and that is providing the functionality associated with the window, the application program executing independently of the computer-executable instructions;
   notifying the independently-executing application program of the display of the task reference;
   receiving, from the independently-executing application program, in response to the notifying, information identifying the functionality associated with the window and interface elements associated with the functionality;
   detecting a first user action directed to the task reference; and
   generating, in response to the detecting the first user action, a display of a display element proximate to, and external to, the display of the task reference, the display element having fully contained within it a thumbnail of the window and a toolbar associated with the window, the toolbar being displayed within the display element proximate to the thumbnail, the toolbar comprising the interface elements.

2. The computer-readable storage media of claim 1, comprising further computer-executable instructions directed to: detecting a second user action directed to at least one interface element from among the interface elements displayed in the toolbar; and notifying the application program of an invocation of a function associated with the at least one user interface element to which the second user action was directed in response to the detecting the second user action.

3. The computer-readable storage media of claim 1, comprising further computer-executable instructions directed to: receiving, from the independently-executing application program, additional information identifying modified functionality associated with the window and additional interface elements associated with the modified functionality; and regenerating, in response to the receiving the additional interface elements, the display of the display element, the regenerated display element comprising a regenerated toolbar comprising at least some of the additional interface elements.

4. The computer-readable storage media of claim 1, wherein at least one interface element from among the interface elements displayed in the toolbar is a notification.

5. The computer-readable storage media of claim 1, wherein the first user action directed to the task reference is a hovering of a cursor on the task reference.

6. The computer-readable storage media of claim 1, wherein the display element has fully contained within it, it addition to the thumbnail of the window and the toolbar displayed proximate thereto, another toolbar associated with another window that is also being hosted by the independently-executing application program, the other toolbar comprising at least one different interface element.

7. The computer-readable storage media of claim 1, comprising further computer-executable instructions directed to: selecting only some of the received interface elements to be displayed as part of the toolbar if the received interface elements exceed a maximum number of interface elements of which the toolbar can be comprised.

8. The computer-readable storage media of claim 7, wherein the received information further comprises a relative importance of the interface elements; and wherein further the selecting is performed with reference to the relative importance of the interface elements.

9. A method for providing access to functionality associated with a window while the window remains hidden comprising the steps of:
    generating a display of a task reference for an independently-executing application program that is hosting the window and that is providing the functionality associated with the window;
    notifying the independently-executing application program of the display of the task reference;
    receiving, from the independently-executing application program, in response to the notifying, information identifying the functionality associated with the window and interface elements associated with the functionality;
    detecting a first user action directed to the task reference; and
    generating, in response to the detecting the first user action, a display of a display element proximate to, and external to, the display of the task reference, the display element having fully contained within it a thumbnail of the window and a toolbar associated with the window, the toolbar being displayed within the display element proximate to the thumbnail, the toolbar comprising the interface elements.

10. The method of claim 9, further comprising the steps of: detecting a second user action directed to at least one user interface element from among the interface elements displayed in the toolbar; and notifying the application program of an invocation of a function associated with the at least one user interface element to which the second user action was directed in response to the detecting the second user action.

11. The method of claim 9, further comprising the steps of: receiving, from the independently-executing application program, additional information identifying modified functionality associated with the window and additional interface elements associated with the modified functionality; and regenerating, in response to the receiving the additional interface elements, the display of the display element, the regenerated display element comprising a regenerated toolbar comprising at least some of the additional interface elements.

12. The method of claim 9, wherein at least one interface element from among the interface elements displayed in the toolbar is a notification.

13. The method of claim 9, further comprising the steps of: selecting only some of the received interface elements to be displayed as part of the toolbar if the received interface elements exceed a maximum number of interface elements of which the toolbar can be comprised.

14. A computing device comprising a display device on which is generated a user interface comprising:
    a task reference displayed in an active tasks area of the display and associated with an application program hosting a window, which is hidden, the application program providing functionality associated with the window;
    a floating display element proximate to, and external to, the task reference, the floating display element having fully contained within it a thumbnail of the window and a toolbar associated with the window, the toolbar being displayed within the floating display element proximate to the thumbnail; and
    the toolbar comprising interface elements associated with the functionality associated with the window, the interface elements having been provided by the application program in response to a notification of the display of the task reference.

15. The computing device of claim 14, wherein the task reference is an icon of the application program.

16. The computing device of claim 14, wherein at least some of the interface elements are buttons whose selection invokes at least some of the functionality associated with the window.

17. The computing device of claim 14, wherein at least some of the interface elements are notifications.

18. The computing device of claim 14, wherein the floating display element has fully contained within it, it addition to the thumbnail of the window and the toolbar displayed proximate thereto, another toolbar associated with another window that is also hosted by the application program, the other toolbar comprising at least one different interface element.

* * * * *